United States Patent
Kamei et al.

(10) Patent No.: US 10,458,832 B2
(45) Date of Patent: Oct. 29, 2019

(54) FUNCTIONAL DIAGNOSIS OF AN ELECTROMECHANICAL FILL STATE MEASURING DEVICE

(71) Applicant: Endress + Hauser GmbH + Co. KG, Maulburg (DE)

(72) Inventors: Yoichi Kamei, Yamanashi (JP); Andreas Kaiser, Todtnau (DE); Dietmar Spanke, Steinen (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 220 days.

(21) Appl. No.: 15/509,268

(22) PCT Filed: Aug. 19, 2015

(86) PCT No.: PCT/EP2015/069049
§ 371 (c)(1),
(2) Date: Mar. 7, 2017

(87) PCT Pub. No.: WO2016/037816
PCT Pub. Date: Mar. 17, 2016

(65) Prior Publication Data
US 2017/0254691 A1 Sep. 7, 2017

(30) Foreign Application Priority Data

Sep. 11, 2014 (DE) .................... 10 2014 113 082
Dec. 8, 2014 (DE) .................... 10 2014 118 067

(51) Int. Cl.
*G01F 23/00* (2006.01)
*G01F 23/40* (2006.01)
(Continued)

(52) U.S. Cl.
CPC .......... *G01F 23/0023* (2013.01); *G01F 23/30* (2013.01); *G01F 23/40* (2013.01); *G01F 25/0061* (2013.01); *G01F 25/0069* (2013.01)

(58) Field of Classification Search
CPC .. G01F 23/0023; G01F 23/30; G01F 25/0069; G01F 23/40; G01F 25/0061
See application file for complete search history.

(56) References Cited

U.S. PATENT DOCUMENTS 3,838,518 A 10/1974 Hendrickson
4,013,194 A 3/1977 Moscarini
(Continued)

FOREIGN PATENT DOCUMENTS

DE 819923 C 11/1951
DE 1961625 U 6/1967
(Continued)

OTHER PUBLICATIONS

German Search Report, German Patent Office, Munich, DE—dated Jun. 22, 2015.
(Continued)

*Primary Examiner* — Xin Y Zhong
(74) *Attorney, Agent, or Firm* — Bacon & Thomas, PLLC

(57) ABSTRACT

A method for the functional diagnosis of an electromechanical fill state measuring device in which a displacement element on a measuring wire is lowered into a filling material in a container such that in an equilibrium state, the weight of the displacement element minus a displacement element buoyancy, which depends upon at least one equilibrium volume, is determined to be equal to a resulting weight of the displacement element. The resulting weight is specified, and the specified resulting weight is kept constant by correspondingly changing the length of the measuring wire in the equilibrium state. The fill state of the filling
(Continued)

material is ascertained using the length of the lowered measuring wire. In order to diagnose a function, the specified value of the equilibrium volume of the displacement element is changed, and the resulting change in the length of the measuring wire is ascertained on the basis of the constant equilibrium state of the resulting weight.

10 Claims, 3 Drawing Sheets

(51) Int. Cl.
*G01F 25/00* (2006.01)
*G01F 23/30* (2006.01)

(56) References Cited

U.S. PATENT DOCUMENTS

| | | | | |
|---|---|---|---|---|
| 2002/0038571 | A1* | 4/2002 | Chuang | G01F 23/0023 73/313 |
| 2005/0210963 | A1 | 9/2005 | Yekutiely et al. | |
| 2013/0269432 | A1* | 10/2013 | Brutschin | G01F 23/44 73/313 |

FOREIGN PATENT DOCUMENTS

| | | |
|---|---|---|
| DE | 7031884 U | 11/1970 |
| DE | 2151094 A1 | 4/1973 |
| DE | 7329766 U | 11/1973 |
| DE | 2401486 A1 | 7/1974 |
| DE | 2544038 A1 | 4/1977 |
| DE | 2659416 A1 | 7/1977 |
| DE | 2853360 A1 | 7/1979 |
| DE | 3721164 A1 | 1/1988 |
| DE | 3942239 A1 | 7/1991 |
| DE | 19543352 A1 | 1/1997 |
| DE | 19730196 A1 | 2/1999 |
| DE | 202004018047 U1 | 2/2005 |
| DE | 102010056511 A1 | 7/2012 |
| DE | 102014118067 A1 | 3/2016 |
| WO | WO2006004649 A2 | 1/2006 |
| WO | WO2012040017 A2 | 3/2012 |

OTHER PUBLICATIONS

International Search Report, EPO, The Netherlands—dated Nov. 27, 2015.
English Translation of the International Preliminary Report on Patentability, WIPO, Geneva, CH—dated Mar. 23, 2017.

* cited by examiner

FUNCTIONAL DIAGNOSIS OF AN ELECTROMECHANICAL FILL STATE MEASURING DEVICE

TECHNICAL FIELD

The invention relates to a method for the functional diagnosis of an electromechanical fill state measuring device in which a displacement element on a measuring wire is lowered into a filling material in a container such that, in an equilibrium state, the weight of the displacement element minus a displacement element buoyancy, which depends upon at least one equilibrium volume, is determined to be equal to a resulting weight of the displacement element, wherein the resulting weight is specified, and the specified resulting weight is kept constant by correspondingly changing the length of the measuring wire in the equilibrium state, wherein the fill state of the filling material is ascertained using the length of the lowered measuring wire.

BACKGROUND DISCUSSION

Methods and devices for fill state measurement that work according to the plumb-bob principle are sufficiently known. For example, in the documents, German patents, DE 21 51 094, DE 24 01 486 B2, DE-PS 819 923, and DE 39 42 239 A1; US-PS 3,838,518; German patents, DE 195 43 352 A1, G 70 31 884.2, DE-PS 819 923, and G 73 29 766.2, DE 19730196 A1, and DE 28 53 360 A1, fill state measuring systems for highly precise fill state determination are described, which work according to the plumb-bob principle. In these methods for the fill state measurement according to the plumb-bob principle, a plumb bob hanging on a measuring rope is lowered onto the filling material or bulk material. Upon reaching the filling material, the length of the measuring rope that was taken off the rope drum is determined, and the fill height or fill quantity is displayed on a display device. Different plumb bobs are advantageously used for different filling materials.

The main field of application of electromechanical bob plumbing is the fill state measurement of very tall containers, where solutions with other measuring principles are very cost-intensive or not possible for physical reasons. With electromechanical bob plumbing, fill states in containers of, at present, up to approx. 70 m height can be measured with a precision of less than one millimeter.

Other devices for fluid level measurement and density determination, which function according to the displacement measuring principle, became known from German patents, DE 37 21164 A1, DE2853360A1, DE 2401486 B2, and DE 2659416 A1.

From German patent, DE2853360A1 is known a fluid level measuring device with a displacement body. This displacement body is provided with a wire, which can be wound onto or unwound from a drum. The drum is driven by a shaft by means of a motor, wherein a device for determining the change in the torque exerted on the shaft is provided.

In German patent, DE 2659416 A1, a device for measuring a fluid level is described, in which the change in the fluid level is converted into a rotational movement. Furthermore, a magnetic head is provided on an arm, which rotates according to the change in the fluid level and, in the process, senses magnetic fields, which are produced by electrical conductors arranged on the circumference of a disk.

German patent, DE 2401486 B2 discloses a fill state display device according to the displacement measuring principle, in which a rope is unwound from or wound onto a drum, wherein a counting disk co-rotates and, in the process, generates via shielding-gas contact switches a continuous pulse sequence, which is a measurement of the rope length used.

Published international application, WO2012/040017 A2 describes a method for checking an electromechanical fill state measuring device, in which the torque is determined in a test mode by means of the measuring drum, and a mechanical problem is found if the measured torque exceeds a specified upper value or if the measured torque falls below a specified lower value. The test mode is initiated and executed between two measurements in the measurement mode, so that the measurement operation must be interrupted in this method. In this method, it is furthermore disadvantageous that the test mode requires a long test time, during which no measurement results are delivered.

From German patent, DE 37 21164 A1, a fill state measuring device is known, which includes a float on a wire, which floats on the surface of a fluid (not shown). The wire is wound on a drum and can be spooled onto this drum or unspooled from it. The bottom of the drum is connected to a measuring shaft. If the fluid level, on which the float floats, changes, the stress exerted by the wire on the drum thus also changes. This change in the stress exerted by the wire is converted into a torque on the measuring shaft via an outer magnetic ring acting as a coupling part. The cylindrical outer magnetic ring is connected to the bottom inside the drum. Magnetic poles, south poles and north poles, are arranged alternately in the circumferential direction of the outer magnetic ring. On the inner magnetic ring connected to the measuring shaft, magnetic north and south poles are alternately formed in the same quantity as on the outer magnetic ring. An electromagnetic transducer, e.g., a Hall element, is arranged on the outer circumference of the inner magnetic ring in the border area between different magnetic poles. If a force that causes a relative movement between the outer and inner magnetic rings is generated during a change in the fluid level to be measured, a change in the magnetic flux present between the outer and the inner magnetic rings causes an electrical signal in the electromagnetic transducer, by means of which signal the measuring shaft is rotated such that the relative movement between the inner and the outer magnetic rings is returned to zero, and a measured value of the fluid level reached is obtained thereby. By means of a sliding contact located on the measuring shaft, the electrical signal of the electromagnetic transducer is transmitted in the inner drum to the servomotor control. This mechanical tapping has the disadvantage that it does not take place without wear.

SUMMARY OF THE INVENTION

The invention is based upon the object of providing a method for the functional diagnosis of a fill state measurement according to the displacement measuring principle, which method allows for an automatically executed functional test during the measurement operation, without the measurement or the measurement operation being interrupted, and is easy to implement.

This object is achieved by means of a method for the functional diagnosis of an electromechanical fill state measuring device in which a displacement element on a measuring wire is lowered into a filling material in a container such that, in an equilibrium state, the weight of the displacement element minus a displacement element buoyancy, which depends on at least one equilibrium volume, is determined to be equal to a resulting weight of the displacement element, wherein the resulting weight is specified, and the specified resulting weight is kept constant by correspondingly changing the length of the measuring wire in the equilibrium state, wherein the fill state of the filling material is ascertained using the length of the lowered measuring wire, wherein, for the functional diagnosis, the specified value of the equilibrium volume of the displacement element is varied by means of a defined equilibrium volume change, and the resulting change in the length of the measuring wire is ascertained based upon the equilibrium state, kept constant, of the resulting weight.

According to an addition to the invention, the specified value of the equilibrium volume of the displacement element is changed via the defined equilibrium volume change by changing a parameter of the equilibrium volume in an evaluation algorithm of the electromechanical fill state measuring device.

According to a development of the invention, the corresponding change in the length of the measuring wire wound onto a measuring drum in one layer causes a change in the torque on the measuring drum, from which a change in the resulting weight is determined by the evaluation algorithm.

According to a first advantageous exemplary embodiment of the method according to the invention, the defined equilibrium volume change is performed in one step, whereby a correspondingly large change in the length of the measuring wire or a correspondingly large height change in the immersion depth of the displacement element in the filling material is caused, which is greater than or equal to the smallest possible resolution of the measurement of the fill state of the electromechanical fill state measuring device, and the resulting large changes in the measured value of the fill state are appropriately compensated for by the evaluation algorithm.

According to a second complementary exemplary embodiment of the method according to the invention, the equilibrium volume change is performed in very small individual steps, whereby correspondingly very small changes in the length of the measuring wire or very slight height changes in the displacement element are caused, which are smaller than the smallest possible resolution of the measurement of the fill state of the electromechanical fill state measuring device, and the determinations of the fill state are thus not affected by the evaluation algorithm.

According to a further development of the second exemplary embodiment, the number of the small individual steps is calculated by the evaluation algorithm by determining the height change from the equilibrium volume change, knowing the cross-sectional area of the displacement element, and by determining the number of the small individual steps to be larger than the quotient of the height change divided by the smallest possible resolution of the measurement of the fill state.

According to a further addition to the second exemplary embodiment, small individual steps for height changes are performed in an area of the displacement element between an upper limit and a lower limit of the equilibrium volume, in which the cross-sectional area of the displacement element is constant.

According to another development of the second exemplary embodiment, the height changes are performed with different small individual steps with different step heights.

According to another complement to the second exemplary embodiment, the functional diagnosis by the evaluation algorithm is continuously performed during the measurement operation of the electromechanical fill state measuring device, and they do not affect each other, in that the displacement element is steadily lowered and raised by the height changes in small individual steps.

According to a further design of the exemplary embodiments, the movement of the servomotor, the weight measurement of the displacement element, the movement of the measuring drum and of the displacement element, the parameters entered regarding the displacement element currently hanging on the measuring wire, the sensor electronics unit, the main electronics unit, and the evaluation algorithm are checked and monitored by means of this functional diagnosis of the electromechanical fill state measuring device. The sensor system is checked by varying the weight and by the freezing of the measured value being able to be detected thereby, for example.

Additional details, features, and advantages of the object of the invention result from the following description with the associated drawings, in which preferred exemplary embodiments of the invention are illustrated. In the exemplary embodiments of the invention shown in the figures, elements that correspond in their structures and/or in their functions are provided with the same reference symbol for the sake of clarity and simplicity. The figures show:

DETAILED DISCUSSION IN CONJUNCTION WITH THE DRAWINGS

Figure 1:
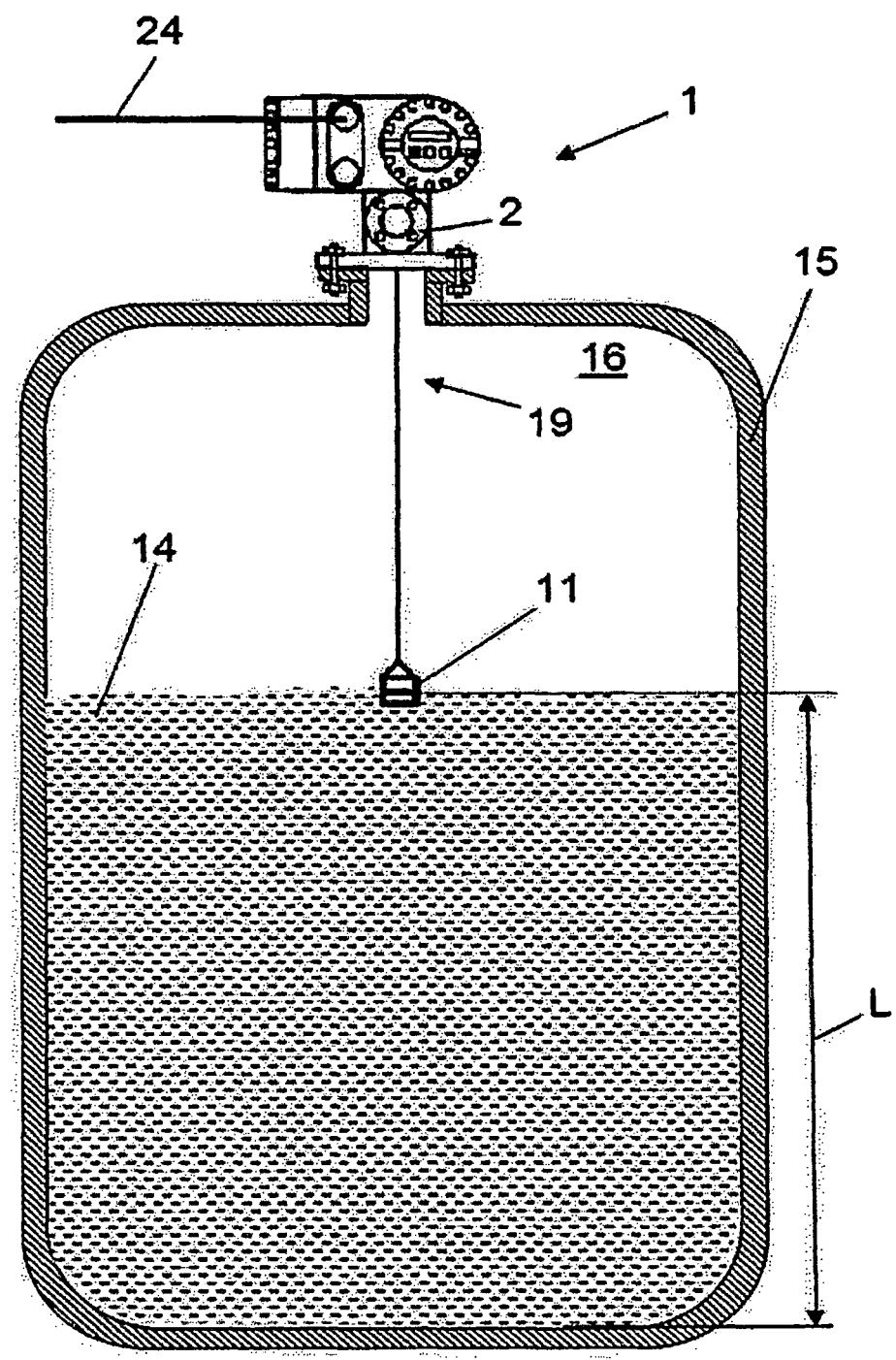
FIG. 1 is an exemplary embodiment of a measuring device for determining the fill state according to the displacement measuring principle.
Figure 2:
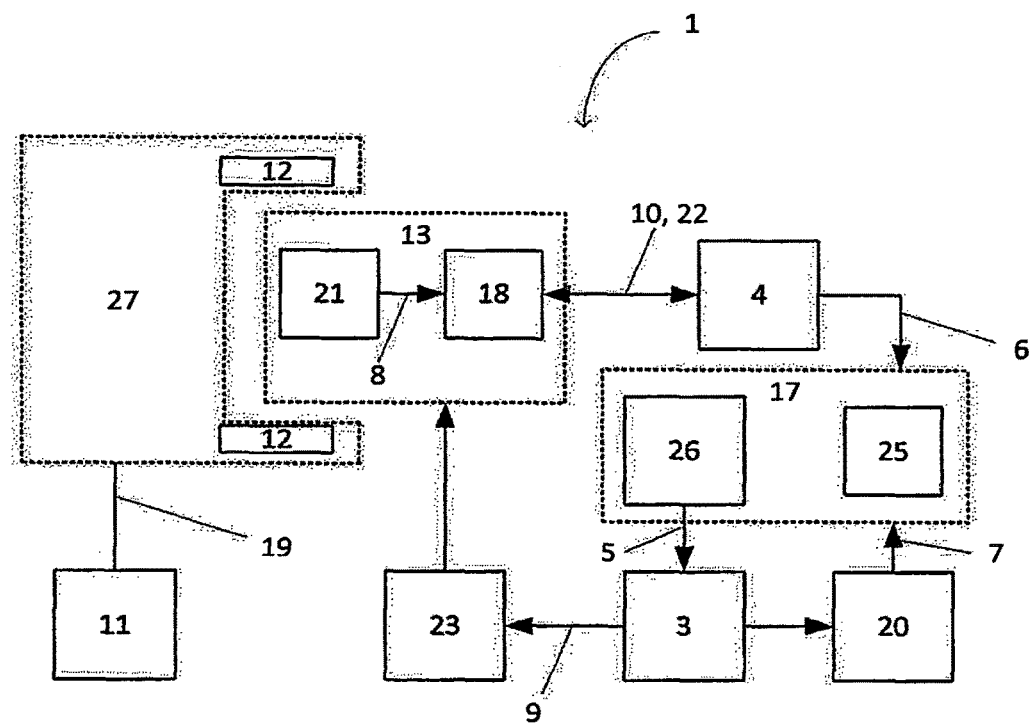
FIG. 2 is a schematic block diagram of an electromechanical fill state measuring device.

FIG. 1 shows a mechanical fill state measuring device 1, which is, for example, sold by the company, Endress+Hauser under the name PROSERVO NMS 53x—tank measuring system and is based upon the principle of the displacement measurement of a displacement element 11. The small displacement element 11 is positioned precisely in the fluid 14 in the container 15 by means of a servomotor 3 on a measuring rope 19. As soon as the fill state L of the fluid 14 in the container 15 rises or falls, the displacement element 11 is repositioned by the servomotor 3 by rotating the measuring shaft 10 with the measuring drum 27, 12, 13 (FIG. 2). The rotation of the measuring drum 27, 12, 13 is evaluated, in order to determine the fill state 16. The determination of other measurands, such as separation layer measurement and density measurement, of the individual layers of the filling material 14 can also be performed using this measuring principle.

In modern industrial plants, field devices are generally connected via bus systems 24, such as Profibus® PA, Foundation Fieldbus®, or HART®, to at least one higher-level control unit, which is not explicitly shown here. The data communication controlled by the control unit on the bus system 24 can be both wired and wireless. Usually, the higher-level control unit is an SPS or a PLC (programmable logic controller), or a DCS (distributed control system). The higher-level control unit is used for process control, process visualization, process monitoring, as well as commissioning and operating the field devices.

FIG. 2 shows a block diagram of a fill state measuring device 1, which functions according to the displacement measuring principle of a displacement element or float 11. The displacement element or the float 11 is attached to one end of a measuring rope or measuring wire 19, and the other end of the measuring rope 19 is mostly wound onto an outer rope drum 12 or an outer measuring drum 27 in one layer.

The small displacement element 11 is positioned precisely in the fluid or in the liquid filling material 14 at a boundary of the equilibrium volume VB by means of a small servomotor 3. The displacement element 11 hangs on a measuring wire or measuring rope 19, which is wound with a constant winding diameter in one layer onto a measuring drum 27 or an outer rope drum 12 provided with fine grooves inside the measuring device 1. The outer rope drum 12 is, for example, coupled via coupling magnets with the inner rope drum 13, which are spatially separated completely and hermetically sealed from one another by the drum housing. The outer magnets are connected to the outer rope drum 12, and the inner magnets to the inner rope drum 13. While the magnets rotate, the magnetic pull causes the outer magnets to co-rotate so that the entire drum assembly consisting of the outer rope drum 12 and the inner rope drum 13 rotates on the measuring shaft 10.

While the magnets rotate with the inner rope drum 13, the magnetic pull causes the outer magnets to co-rotate on the outer rope drum 12 so that the entire drum assembly rotates. As a result of the weight of the displacement element 11 on the measuring wire 19, a torque acts on the outer magnet, whereby a change in the magnetic flux comes about. These magnetic field changes acting between the components of the measuring drum 12, 13 are detected by a special electromagnetic transducer 21, e.g., a Hall sensor, on the inner measuring drum 13. The transducer signal 8 is further processed by the sensor electronics unit 18 into a weight measurement signal 6. The weight measurement signal 6 of the sensor electronics unit 18 is conducted via sensor signal lines 22 along the measuring shaft 10 to a sliding contact and/or rotation transformer 4, and forwarded to the main electronics unit 17. This weight measurement signal 6 is evaluated with the position data signal 7 of an encoder or coder 20, which is located on a drive motor shaft, by a microprocessor 25 in the main electronics unit 17. A corresponding motor control signal 5 is transmitted by a motor control electronics unit to the drive motor 3. The drive motor 3 is controlled by the motor control signal 5 such that the voltage produced by the changes in the magnetic flux is adapted at the transducer 21 to the voltage specified by the operating command. When the displacement element 11 is lowered and placed on the surface of the fluid 14, the weight of the displacement element 11 is reduced by the buoyancy $F_B$ of the displacement element 11 in the fluid 14. The torque in the magnetic coupling between the outer rope drum 12 or measuring drum 27 and the inner rope drum 13 changes thereby. This change is, for example, measured by five temperature-compensated Hall detector chips as measuring element 21. The position data signal 7, which indicates the position of the displacement element 11, is transmitted to the motor control electronics unit 26 in the main electronics unit 17, such as a microprocessor 25. As soon as the level of the fluid 14 rises and falls, the displacement element 11 is repositioned by the drive motor 3 by means of gears 23 and the servomotor 3. The rotation of the measuring drum 27 is precisely evaluated from at least the position data signal 7 and the weight measurement signal 6, in order to determine the fill state value 16 up to a precision of +/−0.7 mm.

This design of an electromechanical fill state measuring device 1 with a sliding contact located on the measuring shaft 10 for transmitting an electrical transducer signal 8 of the electromagnetic transducer 21 in the inner rope drum 13 to the main electronics unit 17—in particular, the servomotor control electronics unit 26—has the disadvantage that this mechanical tapping of the transducer signal 8 via the sliding contacts does not take place without wear, and that a torque change can be generated by frictional resistances and measurement inaccuracies thus occur. For this reason, it is advantageous, for the transmission of the electrical transducer signal 8, to arrange the sensor electronics unit 18 on the inner rope drum 13 and to, for example, use an inductive rotation transformer 4. This rotation transformer 4 transmits a digital weight measurement signal 6 from the sensor electronics unit 18 to the main electronics unit 17—in particular, the microprocessor 25. As a result of the good transmission properties of the radial rotation transformer 4 of the weight measurement signal 6 and, in the opposite direction, the possibility of the reliable energy supply of the sensor electronics unit 18 by the main electronics unit 17, it is possible to design the sensor electronics unit 18 directly inside the inner rope drum 13 close to the measuring elements 21. A more precise evaluation of the measuring elements 21—in particular, the Hall sensors—and a preprocessing of the measured values of the measuring elements 21 is thereby made possible.

Figure 3:
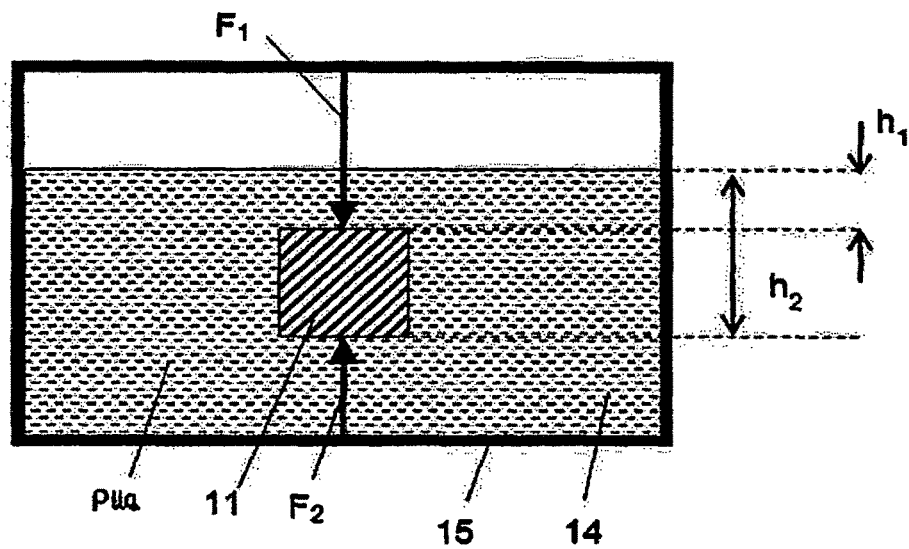
FIG. 3 is a schematic drawing regarding the displacement element buoyancy.

FIG. 3 shows a schematic drawing regarding the derivation of the buoyancy $F_B$ of the displacement element 11. If a displacement element 11 is immersed in a fluid 14, the resulting weight $F_{res}$ on the measuring wire 19 changes due to the buoyancy $F_B$ acting on the displacement element 11. The buoyancy $F_B$ can be derived using the following calculations:

$$F_B = F_{res} - F_g = A^* p_2 - A^* p_1 = A(p_2 - p_1)$$

The buoyancy $F_B$ is a resulting weight $F_{res}$ opposing the gravitational force $F_g$ on a displacement element 11 in fluids or gases 14.

$$p_{liq} = \rho_{liq} * g * h$$

The pressure $p_{liq}$ in the fluid 14 can be determined via the product of the density $\rho_{liq}$ of the fluid 14, the height h, and the gravitational acceleration g. From this, a formula, which is dependent upon the total immersion depth $h_2$ and the submersion depth $h_1$, for the buoyancy $F_B$ can be derived.

$$F_B = A^* \rho_{liq} * g * (h_2 - h_1)$$

The equilibrium volume $V_B$ of the displacement element 11 results from the difference of the total immersion depth $h_2$ and the submersion depth $h_1$ multiplied by the cross-sectional area A of the displacement element 11.

$$V_B = A^* (h_2 - h_1)$$

This results in a formula for the buoyancy $F_B$ $$F_B = \rho_{liq} * g * V_B$$

The resulting mass $m_{res}$ of the displacement element 11, if it is immersed in the fluid 14 in a balanced manner, results from the following formulas:

$$F_{res} = F_{Disp} - F_B$$

$$F_{res} = m_{Disp} * g - \rho_{liq} * g * V_B$$

$$m_{res} = m_{disp} - \rho_{liq} * V_B$$

For each displacement element 11, an equilibrium volume $V_B$ is specified as parameter, at which equilibrium volume the displacement element 11 is generally immersed halfway in the medium. If the parameters of the equilibrium volume $V_B$ and the density $\rho_{liq}$ of the fluid 14 are thus specified to the electromechanical fill state measuring device 1, the evaluation electronics unit can determine the resulting mass $m_{res}$ of the displacement element 11 by means of the evaluation algorithm and balance the displacement element according to the submersion depth $h_1$.

Figure 4:
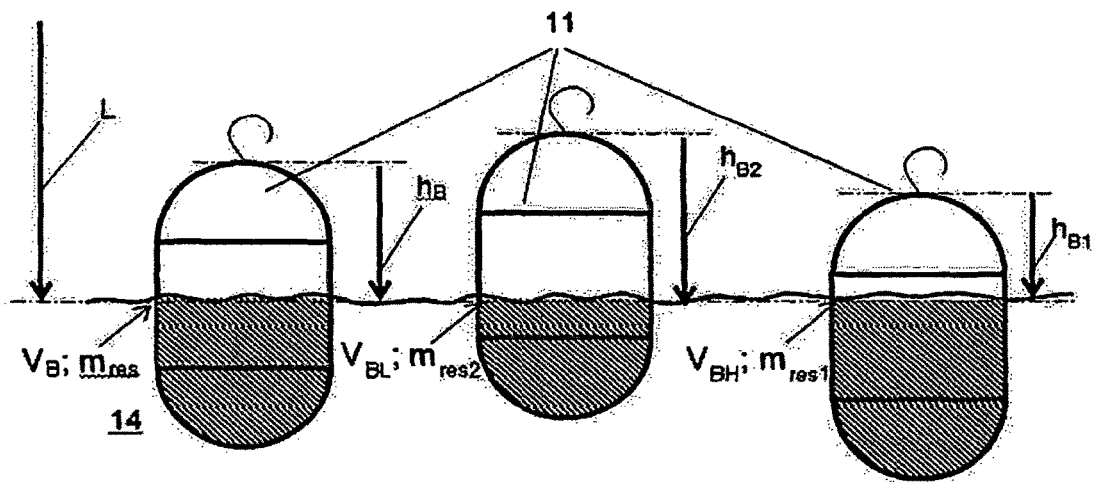
FIG. 4 is a schematic drawing of the variation according to the invention in the equilibrium volume of the displacement element.
Figure 5:
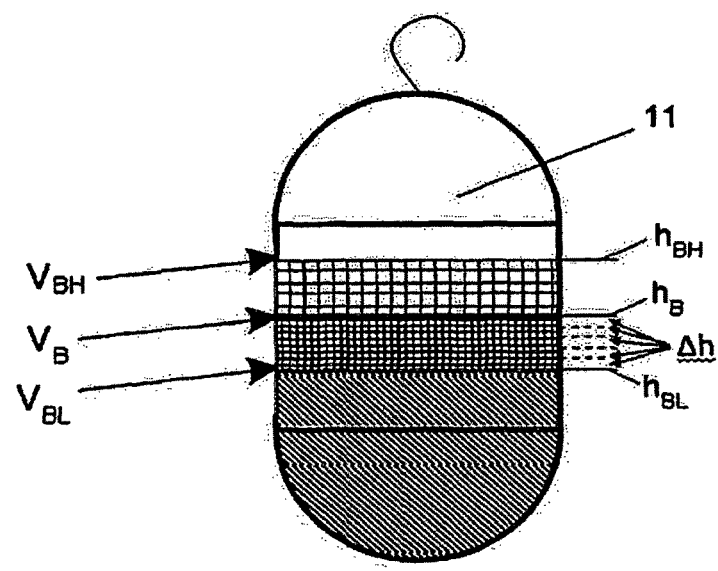
FIG. 5 is a schematic drawing of the variation according to the invention in the equilibrium volume of the displacement element in small steps.

FIG. 4 and FIG. 5 show schematic drawings of the variation according to the invention of the equilibrium volume $V_B$ of the displacement element 11. For the functional diagnosis of the electromechanical fill state measuring device, the movement of the servomotor 3, the resulting mass $m_{res}$ of the displacement element 11, the movement of the measuring drum 27 and of the displacement element 11, and the checking of entered parameters regarding the displacement element 11 currently hanging on the measuring wire 19 can, for example, be checked and monitored. In the functional diagnosis according to the invention, the parameter of the equilibrium volume $V_B$ is changed for this purpose on the electromechanical fill state measuring device 1 during the fill state measurement. If the equilibrium volume $V_B$ is, for example, increased in a single step or in small individual steps dn up to an upper limit of the equilibrium volume $V_{BH}$, the resulting mass $m_{res}$ is reduced to a first resulting mass $m_{res1}$ at the upper limit, whereby the displacement element 11 is lowered to a first height $h_{B1}$, measured starting from the upper edge of the displacement element 11, until the measured resulting mass $m_{res}$ is equal to the first resulting mass $m_{res1}$ at the upper limit. However, if the equilibrium volume $V_B$ is, for example, decreased in a single step or in small individual steps dn to a lower limit of the equilibrium volume $V_{BL}$, the resulting mass $m_{res}$ is increased to a second resulting mass $m_{res2}$ at the lower limit, whereby the displacement element 11 in turn is raised to a second height $h_{B2}$, measured starting from the upper edge of the displacement element 11, until the measured resulting mass $m_{res}$ is equal to the second resulting mass $m_{res2}$ at the lower limit.

In order for the jumps in the measurement signal of the resulting weight $F_{res}$ or the resulting mass $m_{res}$ to be small, the equilibrium volume change $\Delta V_B$ is performed in very small individual steps dn, whereby correspondingly very small changes in the length of the measuring wire 19 or very small height changes $\Delta h$ in the displacement element 11 are caused, which are smaller than the smallest possible resolution of the measurement of the fill state L of the electromechanical fill state measuring device, and the determinations of the fill state L and/or the resulting mass $m_{res}$ are thus not affected by the evaluation algorithm.

For this purpose, the equilibrium volume $V_B$ is changed in small individual steps dn, with, for example, a same step height dh or also with a different step height dh1, dh2 in the area of an upper limit of the equilibrium volume height $h_{BH}$ and a lower limit of the equilibrium volume height $h_{BL}$.

The evaluation algorithm can calculate the number of small individual steps dn by determining the height change $\Delta h$ from the equilibrium volume change $\Delta V_B$, knowing the cross-sectional area A of the displacement element 11. This height change $\Delta h$ can, for example, be less than 10 millimeters. The number of the small individual steps dn is selected such that the quotient of the height change $\Delta h$ divided by the smallest possible resolution of the evaluation algorithm of the electromechanical fill state measuring device 1 is smaller. As described previously, the smallest resolution of the evaluation algorithm of the electromechanical fill state measuring device 1 can, for example, be specified as less than 0.7 millimeters. The number of the small individual steps dn of the evaluation algorithm for the functional diagnosis must be greater than the number of steps that would be necessary for the height change $\Delta h$ with the smallest possible resolution of the evaluation algorithm of the electromechanical fill state measuring device 1 as step size. According to the example values, with a height change $\Delta h$ of 10 millimeters and with a smallest resolution of the evaluation algorithm of 0.7 millimeters, the number of small individual steps dn can be at least 15 steps. In this way, the evaluation algorithm of the functional diagnosis does not affect the evaluation algorithm of the measurement operation of the electromechanical fill state measuring device 1, since the displacement element 11 is always lowered and raised by the height changes $\Delta h$ in small individual steps dn, and these changes are beyond the resolution capacity of the evaluation electronics unit or of the evaluation algorithm of the electromechanical fill state measuring device 1.

The invention claimed is:

1. A method for the functional diagnosis of an electromechanical fill state measuring device comprising the steps of:
    lowering a displacement element on a measuring wire into a filling material in a container such that, in an equilibrium state, the weight of the displacement element minus a buoyancy of the displacement element, which buoyancy depends upon at least one equilibrium volume, is determined to be equal to a resulting weight of the displacement element;
    specifying the resulting weight,
    keeping the specified resulting weight constant by correspondingly changing the length of the measuring wire in the equilibrium state; and
    ascertaining the fill state of the filling material using the length of the lowered measuring wire, wherein:
    the functional diagnosis comprises steps of:
    changing a specified value of the equilibrium volume of the displacement element using a defined equilibrium volume change; and
    ascertaining the resulting change in the length of the measuring wire based upon the equilibrium state, kept constant, of the resulting weight.

2. The method according to claim 1, wherein:
    the specified value of the equilibrium volume of the displacement element is changed via the defined equilibrium volume change by changing a parameter of the equilibrium volume in an evaluation algorithm of the electromechanical fill state measuring device.

3. The method according to claim 1, wherein:
    the corresponding change in the length of the measuring wire wound onto a measuring drum in one layer causes a change in the torque on the measuring drum, from which a change in the resulting weight is determined by the evaluation algorithm.

4. The method according to claim 1, wherein:
    the defined equilibrium volume change is performed in one step, whereby a correspondingly large change in the length of the measuring wire or a correspondingly large height change in the immersion depth of the displacement element in the filling material is caused which is greater than or equal to the smallest possible resolution of the measurement of the fill state of the electromechanical fill state measuring device; and the resulting large changes in the measured value of the fill state are appropriately compensated for by the evaluation algorithm.

5. The method according to claim 1, wherein:

the equilibrium volume change is performed in very small, individual steps, whereby a correspondingly very small change in the length of the measuring wire or very slight height changes in the displacement element are caused, which are smaller than the smallest possible resolution of the measurement of the fill state of the electromechanical fill state measuring device; and the determinations of the fill state are thus not affected by the evaluation algorithm.

6. The method according to claim 5, wherein:

the number of the small individual steps is calculated by the evaluation algorithm by determining the height change from the equilibrium volume change, knowing the cross-sectional area of the displacement element, and by determining the number of the small individual steps to be larger than the quotient of the height change divided by the smallest possible resolution of the measurement of the fill state.

7. The method according to claim 5, wherein:

small individual steps for height changes are performed in an area of the displacement element between an upper limit and a lower limit of the equilibrium volume, in which the cross-sectional area of the displacement element is constant.

8. The method according to claim 5, wherein:

the height changes are performed with different small individual steps with different step heights.

9. The method according to claim 5, wherein:

the functional diagnosis is continuously performed by the evaluation algorithm during the measurement operation of the electromechanical fill state measuring device; and these do not affect each other, in that the displacement element is steadily lowered and raised by the height changes in small individual steps.

10. The method according to claim 1, wherein:

the movement of the servomotor, the weight measurement of the displacement element, the movement of the measuring drum and of the displacement element, the parameters entered regarding the displacement element currently hanging on the measuring wire, and the sensor electronics unit, the main electronics unit, and the evaluation algorithm are checked and monitored by means of this functional diagnosis of the electromechanical fill state measuring device.

* * * * *